United States Patent
Jundt et al.

(10) Patent No.: US 10,649,430 B2
(45) Date of Patent: May 12, 2020

(54) METHOD AND APPARATUS FOR CONFIGURING ACCESS TO MULTI-VARIABLE FIELD DEVICES SIGNALS

(71) Applicant: FISHER-ROSEMOUNT SYSTEMS, INC., Round Rock, TX (US)

(72) Inventors: Larry O. Jundt, Round Rock, TX (US); Julian K. Naidoo, Cedar Park, TX (US); Bruce Hubert Campney, Pflugerville, TX (US); Prashant Joshi, Leicester (GB); Daniel R. Strinden, Austin, TX (US); Cristopher Ian Sarmiento Uy, Metro Manila (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 126 days.

(21) Appl. No.: 16/018,721

(22) Filed: Jun. 26, 2018

(65) Prior Publication Data

US 2019/0391546 A1 Dec. 26, 2019

(51) Int. Cl.
*G05B 19/042* (2006.01)

(52) U.S. Cl.
CPC .. *G05B 19/042* (2013.01); *G05B 2219/25124* (2013.01)

(58) Field of Classification Search
CPC .................. G05B 19/042; G05B 2219/25124
See application file for complete search history.

(56) References Cited

U.S. PATENT DOCUMENTS

| 5,828,851 A | 10/1998 | Nixon et al. |
| 6,449,715 B1 | 9/2002 | Krivoshein |
| 2008/0189441 A1* | 8/2008 | Jundt ............... G05B 19/042 710/3 |
| 2008/0249641 A1* | 10/2008 | Enver ............... G05B 19/042 700/9 |

(Continued)

FOREIGN PATENT DOCUMENTS

| EP | 1012682 A1 | 6/2000 |
| GB | 2554504 A | 4/2018 |
| WO | WO-99/23541 A1 | 5/1999 |

OTHER PUBLICATIONS

Search Report for Application No. GB1908670.1, dated Dec. 10, 2019.

*Primary Examiner* — Mark A Connolly
(74) *Attorney, Agent, or Firm* — Marshall, Gerstein & Borun LLP

(57) ABSTRACT

Systems and methods of configuring process control systems for operating process plants including multi-variable devices are disclosed herein. Multi-variable devices generate data associated with primary parameters and subsequent parameters. To facilitate configuration and use of subsequent parameters within process control systems, new device objects may be generated to represent the subsequent parameters. The new device objects may be generated as child device objects of parent device objects representing the multi-variable devices. Each child device object may also have a unique tag to identify the new device object within the process control system. The subsequent parameters of the multi-variable devices may thus be used within the process control system by reference to the tags of the corresponding child device objects.

30 Claims, 9 Drawing Sheets

(56) References Cited

U.S. PATENT DOCUMENTS

2010/0305720 A1* 12/2010 Doll .................... G05B 19/042
700/86
2012/0079461 A1   3/2012  Copass et al.
2017/0153617 A1   6/2017  Thilderkvist et al.

* cited by examiner

METHOD AND APPARATUS FOR CONFIGURING ACCESS TO MULTI-VARIABLE FIELD DEVICES SIGNALS

TECHNICAL FIELD

The present disclosure relates generally to process control systems for process plants, and more particularly, to techniques of configuring parameters of multi-variable devices within process control systems.

BACKGROUND

Distributed process control systems, like those used in chemical, petroleum, or other process plants, typically include one or more process controllers communicatively coupled to one or more field devices via analog, digital, or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. The process controllers, which are also typically located within the plant environment, may be configured to receive signals indicative of process measurements made by sensors or field devices, as well as other information pertaining to the field devices. The process controllers further execute controller applications that run, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Field devices may be either single-variable devices or may be multi-variable devices, such as smart field devices. Single-variable devices generate only one output variable value, while multi-variable devices generate a plurality of values corresponding out a plurality of output variables. Multi-variable devices include field devices measuring a plurality of process variables associated with conditions within a process plant, as well as other devices generating output data for a plurality of output variables. Multi-variable devices include smart field devices, such as field devices conforming to the well-known Fieldbus protocol may also perform control calculations, alarming functions, and other control functions commonly implemented within a controller. Field devices within a process control system are represented by device objects, which each device object includes a primary parameter for the primary output variable of the field device. A device object representing a multi-variable field device also includes one or more subsequent parameters (e.g., secondary or tertiary parameters) associated with additional output variables of the multi-variable field device, in addition to a primary parameter associated with the primary output variable.

Information from the field devices and the controller is usually made available over a data highway to one or more other hardware devices, such as operator workstations, personal computers, or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. Each of these applications provides a user-interface (UI) to allow a user (e.g., a configuration engineer, a process plant operator, a maintenance technician, etc.) to view or modify aspects of the process plant operation and configuration. Throughout this specification, the phrase "user interface" or "UI" is used to refer to an application or screen that allows a user to view or modify the configuration, operation, or status of the process plant. Similarly, the phrase "user-interface device" or "UI device" is used to refer to a device on which a user interface is operating, whether that device is stationary (e.g., a workstation, wall-mounted display, process control device display, etc.) or mobile (e.g., a laptop computer, tablet computer, smartphone, etc.). A configuration application, which resides in one or more operator workstations or computing devices, enables users to create or change process control modules and download these process control modules via a data highway to dedicated distributed controllers. Typically, these control modules are made up of communicatively interconnected function blocks. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the UIs, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In existing process control systems, control of the process plant involves the operation of one or more control modules implementing process control logic that communicate with field devices to send and receive process control data. Because the field devices may use any of various operation and communication protocols, the control modules must be configured to accept and provide the process control data using the appropriate protocols for each device. In addition, communication links between the control modules and the field devices may add further layers of communication protocols or formats for proper transmission and receipt of process control data. Thus, process control systems typically include a large number of field devices and control modules that receive data generated by the field devices. To simplify configuration and operation of process control systems, field device tags may be used to identify the field devices by a unique name within the process control system. Once configured, the device tag may be used to refer to the field device without requiring specification of the full path within the system to the field device. Although such tags are useful for single-variable field devices, problems arise when such tags are applied to multi-variable devices. Within existing control systems, subsequent parameters of multi-variable field device objects cannot be readily identified using tags or other simplified references, due to limitations in the communication protocols utilized. The invention described herein addresses these issues.

SUMMARY

Disclosed herein are systems and methods for configuring multi-variable devices within a process control system for controlling a process plant. Various aspects of the described systems and methods generate new device objects within the process control system to facilitate access to secondary or other subsequent parameters of the multi-variable device. Such subsequent parameters may be used as primary parameters of the new device objects. The new device objects may be generated as child device objects of a multi-variable device object associated with the multi-variable device. The child device objects may be separately identifiable within the process control system by unique tags, thus simplifying configuration of the process control system.

According to an aspect of the invention described herein, a method of configuring a process control system for controlling a process plant is disclosed, comprising: selecting a device object within the process control system representing a multi-variable device within the process plant; identifying a parameter of the multi-variable device; and generating a new device object representing the identified parameter within the process control system. The parameter may be associated with an output variable generated by the multi-variable device, and the new device object may include a primary parameter representing the output variable of the multi-variable device. According to another aspect of the invention described herein, a system for operating a process plant is disclosed, comprising: a multi-variable device generating output data for a plurality of output variables within the process plant; one or more processors communicatively connected to the multi-variable device; and a program memory communicatively connected to the one or more processors and storing executable instructions that, when executed by the one or more processors, cause the process control system to: select a device object representing the multi-variable device within the process control system; identify a parameter of the multi-variable device; and generate a new device object representing the identified parameter within the process control system. The identified parameter may be associated with one of the plurality of output variables of the multi-variable device, and the new device object may include a primary parameter representing that output variable of the multi-variable device. Other characteristics or components of such system and method may be included in various embodiments, such as those described below. According to yet another aspect of the invention described herein, a tangible, non-transitory computer-readable medium storing executable instructions for configuring a process control system for controlling a process plant is disclosed, comprising instructions that cause a computer system to: select a device object within the process control system representing a multi-variable device within the process plant; identify a parameter of the multi-variable device; and generate a new device object representing the identified parameter within the process control system. The parameter may be associated with an output variable generated by the multi-variable device, and the new device object may include a primary parameter representing the output variable of the multi-variable device. Other characteristics or components of such method, system, and computer-readable medium may be included in various embodiments, such as those described below.

The new device object may be generated as a child device object of the device object. In some embodiments, the new device object may include a scaling parameter associated with the identified parameter. In further embodiments, the child device object may be generated by: selecting a class of device objects from an object library of the process control system, and customizing an instance of the selected class of device objects as the child device object.

In order to identify the parameter of the of the multi-variable device, the method, system, or instructions may further include: presenting a list of parameters of the multi-variable device to a user of the process control system, including the identified parameter, and receiving a selection of the identified parameter from the user. The parameter may then be identified based upon the received selection.

In some embodiments, a unique virtual tag may be generated for the new device object within the process control system. Such unique virtual tag may further be generated in a common namespace with a tag of the device object. In order to generate the unique virtual tag, the method, system, or instructions may further include: receiving an indication of the unique virtual tag from a user, and generating the new device object using the received indication of the unique virtual tag by associating the unique virtual tag with a path to the identified parameter of the multi-variable device. In further embodiments, the unique virtual tag may be used to configure data provision within the process control system by: receiving an indication of a reference to the unique virtual tag from a user of the process control system, wherein the indication of the reference further associates the unique virtual tag with a function block within the process control system, and providing output data for the output variable associated with the identified parameter to the function block via the path associated with the unique virtual tag.

The multi-variable device may be a smart field device generating data associated with a plurality of types of output variables. For example, the multi-variable device may be a field device installed with the process plant generating output data associated with a primary parameter and with one or more subsequent parameters. In such instance, the identified parameter may be associated with one of the subsequent parameters. The multi-variable device may be associated with a plurality of types of output variables in some embodiments, in which case identifying the parameter may further include identifying each of the plurality of types of output variables. The types of output variables may be determined based upon information contained in a device description file of the multi-variable device. In further embodiments, the multi-variable may include a control module, in which case the identified parameter may include a calculated variable that is generated by the control module based upon other variables within the control module. Such calculated variable may be a key performance indicator (KPI) used in control of the process plant.

DETAILED DESCRIPTION

Process control systems are used in a wide range of industrial applications to monitor and operate process plants. Such process control systems may be structured to utilize control modules implementing control logic blocks, loops, routines, or functions. The control modules receive input process control data (e.g., from measurement devices within the process plant) and generate output process control data (e.g., control commands to operate valves, pumps, etc.). The input process data typically includes output data generated by a plurality of field devices disposed within a process plant. Some of the field devices may be multi-variable field devices, generating data regarding a plurality of conditions or metrics within the process plant. Such multi-variable field devices are represented within the process control system by multi-variable device objects, each having a primary parameter associated with a primary variable of the device and at least one subsequent parameter associated with another variable of the device. Configuration of the process control system to use primary parameters in process control is simplified by using tags identifying the device, thereby removing the need to configure the full path to the device every time the device is referenced.

Configuration of the use of subsequent parameters of a multi-variable device object is more difficult because existing process control systems represent the subsequent parameters of a multi-variable device as generic secondary, tertiary, quaternary, etc. parameters, without information indicating the type of output data associated with the subsequent parameters. Accessing output data associated with subsequent parameters thus requires configuration of the path and type of the parameter each time such subsequent parameter is used. To address this problem, the systems and methods described herein generate new device objects for subsequent parameters of device objects representing multi-variable devices within the process control system. The new device objects are preferably generated as child device objects of the multi-variable device object, with each such child device object having a primary parameter identifying the output variable associated with the corresponding subsequent parameter of the multi-variable device object. The new device objects may also be identified by unique tags within the process control system and may be referenced in the process control system in the same manner as other device objects.

Process Control System Overview

Figure 1A:
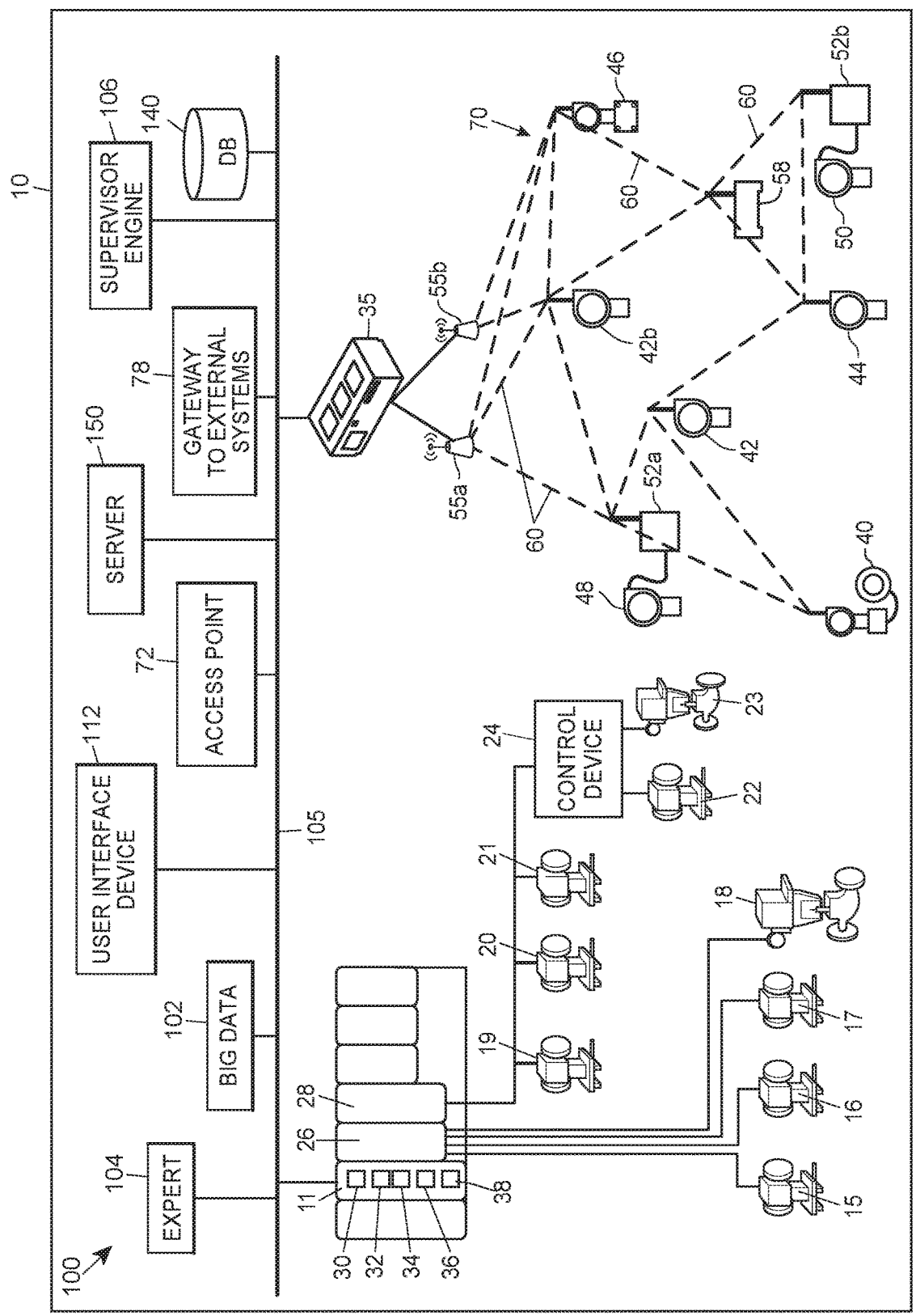
FIGS. 1A-B are block diagrams of an exemplary process control network for operating a process plant.

Turning first to the overall architecture of an example process plant, FIG. 1A is a block diagram of an exemplary process control network 100 operating in a process control system or process plant 10 (or portion thereof). The process control network 100 may include a network backbone 105 providing connectivity directly or indirectly between a variety of other devices. The devices coupled to the network backbone 105 include, in various embodiments, combinations of access points 72, gateways 78 to external systems (e.g., to the Internet), UI devices 112, servers 150, databases 140, big data appliances 102 (e.g., including big data historians), big data expert systems 104, supervisor engines 106, controllers 11, input/output (I/O) cards 26 and 28, wired field devices 15-23, wired control devices 24, wireless gateways 35, and wireless communication networks 70. The communication networks 70 may include wireless devices 40-58, which include wireless field devices 40-46, wireless adapters 52a and 52b, access points 55a and 55b, and router 58. The wireless adapters 52a and 52b may be connected to non-wireless field devices 48 and 50, respectively. The controller 11 may include a processor 30, a memory 32, and one or more control routines 38. Although FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-23 via I/O cards 26 and 28 and may be communicatively connected to wireless field devices 40-46 and non-wireless field devices 48-50 via the network backbone 105 and a wireless gateway 35. The field devices 15-23 or 40-50 may be single-variable field devices or may be multi-variable field devices, such as smart field devices configured to communicate via a smart communication protocol. Multi-variable field devices are field devices (such as the wired or wireless field devices 15-23 or 40-50) that measure, sense, calculate, or otherwise generate two or more parameters corresponding to output variables. Thus, multi-variable field devices generate output variable data for a plurality of parameters, which may be of distinct types (e.g., temperature, pressure, flow, or performance parameters) and which may be measured from the process or computed within a control module of the field device. In some embodiments, the variables of a multi-variable field device may be separate channels communicated by the field device to the controller 11. Some field devices 22 and 23 may be indirectly connected to the controller 11 through a control device 24 that communicates directly with the field devices 22 and 23 and communicates via an I/O card 28 with the controller 11.

The controller 11 may operate to implement a batch process or a continuous process using at least some of the field devices 15-23 and 40-50. The controller 11, which may be, by way of example, the DeltaV™ controller sold by Emerson Process Management, is communicatively connected to the process control network backbone 105. The controller 11 may also be communicatively connected to the field devices 15-23 and 40-50 using any desired hardware and software associated with, for example, standard 4-20 mA devices, I/O cards 26, 28, or any smart communication protocol such as the FOUNDATION® Fieldbus protocol, the HART® protocol, the Wireless HART® protocol, etc. In the embodiment illustrated in FIG. 1A, the controller 11, the field devices 15-23 and 48-50, the control device 24, and the I/O cards 26, 28 are wired devices, and the field devices 40-46 are wireless field devices. Unless the context expressly indicates otherwise, however, any of the field devices 15-23 or 40-50 referenced herein could be implemented as a wired or wireless field device, and communication connections between the controller 11 and the field devices 15-23 or 40-50 could include either or both of wired or wireless connections. Although process control is discussed herein in terms of field devices, any type of process control device may be used in any of the variously described embodiments.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, or any other data that may be captured and stored in the big data appliance 102), from the server 150. In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also control the process by providing input at the UI device 112. To illustrate, the UI device 112 may provide graphics representing, for example, a tank filling process (including data from one or more field devices). In such a scenario, the user may read a tank level measurement and decide that the tank needs to be filled. The user may interact with an inlet valve graphic displayed at the UI device 112 and input a command causing the inlet valve to open.

In further operation, the UI device 112 may execute a number of routines, modules, or services in addition to the UI. In one embodiment the UI device 112 may execute a context awareness routine, which may include, for example, various routines or sub-routines related to location awareness, equipment awareness, or scheduling awareness. These context routines may enable the UI device 112 to render a graphical user interface configuration ("GUI configuration") suited to a particular environment or context in which the UI device 112 is operating. The UI device 112 may also execute a state determination routine, enabling the UI device 112 to track and save the state of the UI device 112, including the state of the applications being executed at the UI device 112 (such as the UI). By tracking the state of applications on the UI device 112, the UI device 112 may allow a user to, for example, initiate a session on a first UI device 112 and start using a second UI device 112, resuming work flow from his previous session with minimal interruption.

The UI device 112 (or the server serving an application or screen to the UI device 112) may also execute routines related to managing plant assets. For example, some routines may be used for installing, replacing, maintaining, calibrating, diagnosing, or commissioning assets in the process plant. Other routines may be used to prepare or complete work orders associated with particular assets or to notify plant personnel (e.g., personnel in the vicinity of a particular device) of a work order. The UI device 112 may execute routines related to monitoring the process. For example, some routines may be used for field logging instrument data, reporting lab samples, displaying real-time asset parameters, and the like. The UI device 112 may further execute routines related to compliance with plant procedures and workflow. For example, some routines may provide information related to standard operating procedures (SOPs), start-up procedures, shut-down procedures, lockout procedures, work instructions, or other product/asset documentation. Still additional routines may, when the UI device 112 is coupled to a network, facilitate immediate delivery of work orders and immediate system availability to off-line, manually entered data. Communication routines may include e-mail routines, text messaging routines, instant messaging routines, etc., for facilitating communication between plant personnel or external parties providing technical or other support.

The UI device 112 (or the server serving an application or screen to the UI device 112) may further include routines supporting or facilitating one or more audit processes. The audit processes may include, for example, work audits or regulatory audits. In embodiments, the routines may allow a user to view data or generate reports related to data collected, maintained, or collated for the purposes of satisfying regulatory requirements. For purposes of illustration, where the mobile control room is implemented in a pharmaceutical manufacturing plant, the mobile control room may facilitate viewing or reporting of data collected for the purposes of satisfying government requirements related to the safety of the product output of the plant. In embodiments, the routines may allow a user to view or generate reports related to auditing of work orders, maintenance, or other plant processes.

In certain embodiments, the UI device 112 may implement any type of client, such as a thin client, web client, or thick client. For example, the UI device 112 may depend on other nodes, computers, or servers for the bulk of the processing necessary for operation of the UI device 112. In such an example, the UI device 112 may communicate with the server 150, where the server 150 may communicate with one or more other nodes on the process control network 100 and may determine the display data or process control data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic. In yet other embodiments, the bulk of the processing for the UI device 112 may take place at the UI device 112. For example, the UI device 112 may execute the previously discussed UI, state determination routine, and context awareness routine. The UI device 112 may also store, access, and analyze data locally.

In operation, a user may interact with the UI device 112 to monitor or control one or more devices in the process control network 100, such as any of the field devices 15-23 or the devices 40-50. The user may interact with the UI device 112, for example, to modify or change a parameter associated with a control routine 38 stored in the controller 11. The processor 30 of the controller 11 implements or oversees one or more process control routines 38 (stored in a memory 32), which may include control loops. The processor 30 may communicate with the field devices 15-23 and 40-50 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process plant 10 may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to configure or implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system to control operation of the process plant 10. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with Fieldbus devices. In instances where the functions blocks are implemented by the field devices themselves, shadow blocks 36 may be executed by the controller 11 to mimic operation of the function blocks. The controller 11 may include one or more control routines 38 that may implement one or more control loops. Each control loop is typically referred to as a control module 34, and may be performed by executing one or more of the function blocks.

The UI device 112 interacts, in some embodiments, with the big data appliance 102 or with the expert system 104 or the supervisor engine 106. The big data appliance 102 may collect and store all types of process control data from the process plant 10, including sensor data, control parameters, manually input data (e.g., static data entered by a process plant operator), personnel locations and command inputs, time stamps associated with all of the data, and any other type of data available in the process plant 10. The expert system 104, communicatively coupled to the big data appliance 102, may operate independently or according to specific user inputs to analyze process plant data stored in the big data appliance 102. The expert system 104 may develop or use models, recognize data trends or correlations, alert plant personnel to actual or predicted problems or abnormal situations or sub-optimal conditions that may be affecting or will soon affect the process plant 10, etc. In some embodiments, the expert system 104 performs these functions without being programmed specifically to associate a particular set of data or trends with a particular problem or condition and, instead, recognizes that a current trend or data concurrence has occurred before at or around the time of a previous condition (which could be a positive/desirable condition or a negative/undesirable condition). From the recognition of the prior occurrence of the trend or data concurrence, the expert system 104 may predict the condition. The expert system 104 may also determine from the data stored in the big data appliance 102 which process variables, sensor readings, etc., are most important in detecting, predicting, preventing or correcting an abnormal situation in the process plant 10. For example, the expert system 104 may determine that hydrocarbons are being vented from a stack and may automatically determine the cause of the hydrocarbon venting or cause work items to be generated (e.g., by the supervisor engine 106) to correct the problem causing the hydrocarbon venting or cause work items to be generated to inspect equipment or observe/record a parameter that is not available via the network. As another example, the expert system 104 may determine that a trend indicated by a series of previous data points indicates a predicted abnormal situation, a predicted maintenance concern, a predicted failure, etc.

As described in detail below, the supervisor engine 106 may interact with the big data appliance 102 or the expert system 104 to perform automatically or facilitate various supervisory activities. For example, the supervisor engine 106 may monitor trends identified by the expert system 104 and create work items for plant personnel. As another example, the supervisor engine 106 may monitor calibration status of process plant resources and may create work items for plant personnel. In connection with these functions, the supervisor engine 106 may also manage personnel certifications, permissions to access equipment during performance of scheduled work items, and timing of work item performance. The supervisor engine 106 may interact with the UI devices 112 to assign and track the performance of work items, and follow-up after the completion of a work item to verify that the status or indication that resulted in the creation of the work item (e.g., the identified trend, abnormal situation, etc.) is resolved. For instance, the supervisor engine 106 may determine from the expert system 104 that a valve is faulty and create a work item. The supervisor engine 106 may later determine that a maintenance worker carrying a UI device 112 is in the vicinity of the faulty valve, and request to assign the work item to the maintenance worker, who may, via the UI device 112, accept the work item. The supervisor engine 106 may verify that the maintenance worker has the proper skill set to perform the work item, and may provide the necessary permissions for the maintenance worker to perform the work item. Additionally, the supervisor engine 106 may reschedule process control activities so that the work item may be completed. The supervisor engine 106 may provide standard operating procedures, manuals, and other documentation to the personnel before or during the performance of the work item. These are but a few examples of the supervisor engine 106, which will be further explained below.

The wireless field devices 40-46 communicate in a wireless network 70 using a wireless protocol, such as the Wireless HART® protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-23 and 40-46 could conform to any other desired standard(s) or protocols, such as any wired or wireless protocols, including any standards or protocols developed in the future.

The wireless gateway 35 may provide access to various wireless devices 40-58 of a wireless communication network 70. In particular, the wireless gateway 35 provides communicative coupling between the wireless devices 40-58 and other nodes of the process control network 100 (including the controller 11). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like.

Similar to the wired field devices 15-23, the wireless field devices 40-46 of the wireless network 70 may perform physical control functions within the process plant 10, e.g., opening or closing valves or take measurements of process parameters. The wireless field devices 40-46 may likewise be single-variable field devices or multi-variable field devices. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART® device. To communicate within the network 30, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 30 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 30. The wireless devices 32-46 and 52-58 may communicate with each other and with the wireless gateway 35 over wireless links 60 of the wireless communication network 70.

Accordingly, FIG. 1A includes several examples of provider devices which primarily serve to provide network routing functionality and administration to various networks of the process control system. For example, the wireless gateway 35, the access points 55a, 55b, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as Wireless HART®.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-23, or wireless devices 35, 40-58) may also communicate using the wireless network supported by the access points 72.

Additionally or alternatively, the provider devices may include one or more external system gateways 78 to systems that are external to the immediate process plant 10. In such embodiments, the UI device 112 may be used to control, monitor, or otherwise communicate with said external systems. Typically, such systems are consumers or suppliers of information generated, used, or changed by the process plant 10. For example, an external system gateway node 78 may communicatively connect the process plant 10 (having its own respective process control data network backbone 105) with another process plant having its own respective network backbone. In another example, the external system gateway node 78 may communicatively connect the process plant 10 to a legacy process plant that does not include a process control network 100 or backbone 105. In this example, the external system gateway node 78 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home). In one such instance, an operator or maintenance technician may use the UI device 112 from her home, connecting to the network backbone 105 via a home network (not shown), the Internet, and the gateway 78. In another instance, an operator or maintenance technician may use the UI device 112 from any location, connecting to the network backbone 105 via a mobile telephony network (not shown), the Internet, and the gateway 78. The gateway nodes 78 may also facilitate communication between plant personnel in the process plant and entities or people outside of the process plant. For example, a technician performing service on a process control device in the process plant may communicate from her UI device 112 with a support representative from the manufacturer of the process control device. In still another example, the supervisor engine 106 may monitor weather, track incoming supply shipments, track financial data (e.g., commodity futures), and the like, to assist the supervisor engine 106 in scheduling work items, managing production schedules, etc. Of course, all connections formed via the gateway 78 (or between any two devices) may be secured connections (e.g., encrypted connections, firewalled connections, etc.).

Additionally or alternatively, the one or more external system gateways 78 may communicatively connect to process plant systems that are external to the process plant 10. In such embodiments, the UI device 112 may be used to control, monitor, or otherwise communicate with said external systems. Typically, such systems are consumers or suppliers of information generated, used, or changed by the process plant 10. For example, a gateway node 78 may communicatively connect the process plant 10 (having its own respective process control data network backbone 105) with another process plant having its own respective network backbone. In another example, the gateway node 78 may communicatively connect the process plant 10 to a legacy process plant that does not include a process control network 100 or backbone 105. In this example, the gateway node 78 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

Although FIG. 1A illustrates a single controller 11 with a small number of field devices 15-23 and 40-50, this is only an illustrative and a non-limiting embodiment. Any number of controllers 11 may be included in the devices of the process control network 100, and any of the controllers 11 may communicate with any number of wired or wireless field devices 15-23, 40-50 to control a process in the plan 10. Furthermore, the process plant 10 may also include any number of wireless gateways 35, routers 58, access points 55, wireless process control communication networks 70, access points 72, or gateways 78.

Figure 1B:
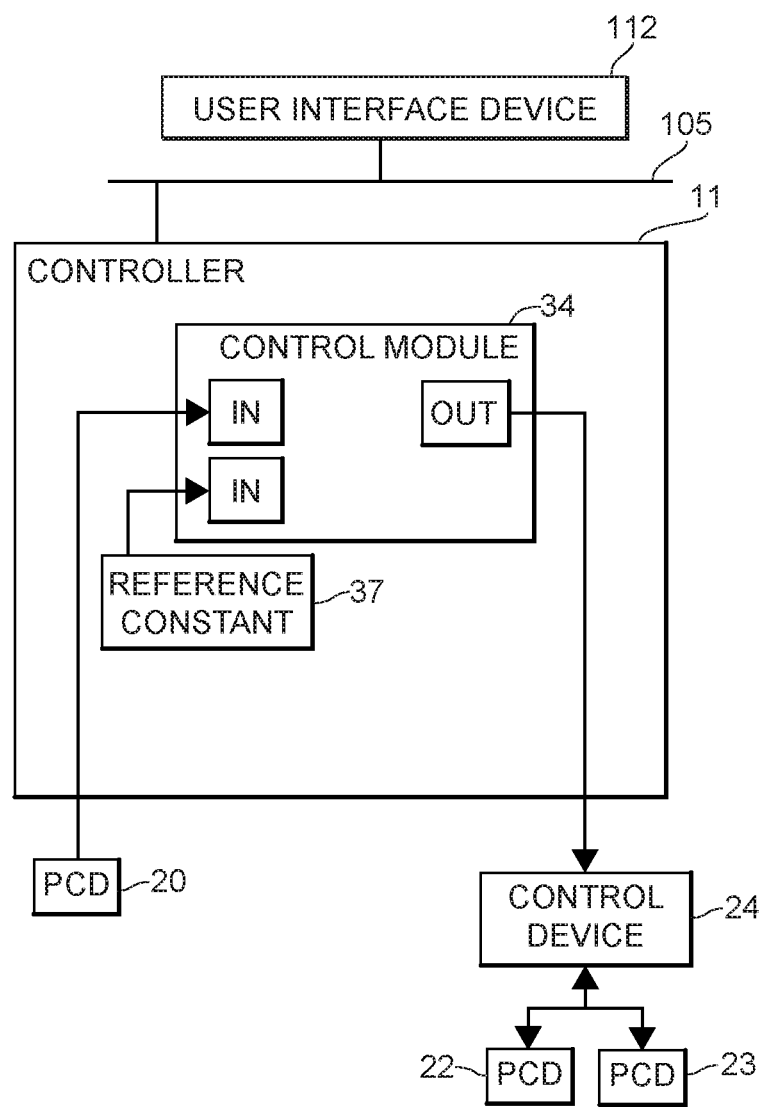

FIG. 1B is a block diagram of a portion of the process control network 100 operating in a process control system of process plant 10, particularly illustrating the operation of an exemplary controller 11. As shown, the controller 11 is communicatively connected to the user interface device 112 through the network backbone 105. The controller 11 is further connected to process control devices or field devices 20, 22, and 23, as well as the control device 24. Specifically, the controller 11 is connected to the field devices 22 and 23 through the control device 24. Additional communication links or components in the I/O architecture (not shown) may further be included in various embodiments.

In the exemplary embodiment illustrated, the controller 11 is configured to run a control module 34 to receive input data from the field device 20 and output control data to the field devices 22 and 23 via the control device 24. The control module 34 may be any type of control module used in operation of the process plant 10, such as a PID controller. Only one control module 34 is shown for clarity, but process plant controllers typically include a plurality of control modules. Such control modules may be implemented as hardware modules, software modules, or a combination of each. The control module 34 may include any number of inputs (IN) and outputs (OUT), each of which may reference a data source as an input or a component as an output. Inputs or outputs may likewise reference other control modules to allow more complex control models to be configured as a combination of simpler control modules. The exemplary control module 34 receives inputs from the field device 20 and a reference constant 37.

The field device 20 generates one or more process variable parameter values as outputs, depending upon the type and configuration of the field device 20. The field device 20 may be a single-variable device generating one output variable or a multi-variable device generating multiple output variables. During configuration of the control module 34, a control engineer selects an output variable of the field device 20 as an input to the control module 34. A reference to a variable of the field device 20 may be selected as a data source for the input of the control module 34. For ease of configuration, the output variable may be selected or referenced by a tag specifically identifying the field device and/or the variable (which may be one of several variables generated by the field device), as discussed further below. The reference constant 37 is a stored value that may be permanently fixed, set by the process plant operator or other user, or generated by the controller 11 or other computing device within the process control network 100. For example, the reference constant 37 may be set periodically or upon occurrence of an event (such as during initial set-up of the process plant 10) by the big data appliances 102, the expert system 104, the supervisor engine 106, or the server 150. In some embodiments, the reference constant 37 may be set by the process plant operator via the UI device 112 or retrieved from the database 140. As a further example, the reference constant 37 may contain a constant data value, such as a set point for a process condition.

The exemplary control module 34 processes the input data to generate an output to one or more of the field devices 22 or 23. The control device 24 receives the output from the control module 34 and further communicates with and controls field devices 22 and 23, which may be legacy field devices or other field devices incapable of direct communication with the controller 11. In some embodiments, shadow blocks (not shown) may be used to mimic within the controller 11 operation of function blocks of the field devices 20, 22, and 23. Such shadow blocks insulate the control module 34 from the necessity of establishing and maintaining communications with the field devices 20, 22, and 23 via the I/O architecture.

Although FIG. 1B illustrates an exemplary controller 11 implementing a single control module 34, this is only an illustrative and a non-limiting embodiment. Any number of control modules 34 having any number of inputs and outputs may be used in various embodiments. Similarly, any number of field devices may be connected (either directly or indirectly) to the controller 11. Additionally, the present description is not limited in scope to the process plant described with respect to FIG. 1A, and may be applicable to other control, monitoring, and safety systems, and the like. While the present description describes embodiments in terms of the process plant 10, this convention is for purposes of convenience only, and is not intended to be limiting.

Process Control System Configuration

Existing process control systems are designed to handle one public parameter for each field device, which was sufficient for field devices that only measured single variables within a process plant. With the development of multi-variable field devices (such as smart field devices), process control systems now frequently need to handle multiple parameters from the same field device. To remain compatible with existing control routines and operator expectations, however, it is desirable that process control systems continue to recognize a primary parameter for each multi-variable field device (e.g., HART_FIELD_VAL), along with the additional subsequent parameters (e.g., HART_SV, HART_TV, or HART_FV). Additionally, existing systems simplify referencing primary parameters of devices by using tags that represent the primary parameter by a unique name that implicitly indicates the type of the parameter (e.g., PT-101 indicates a pressure transmitter, which has a primary parameter type of PRESSURE). Such tags are useful in configuring, modifying, troubleshooting, and operating the control process systems, which may include thousands of references to field device parameters. Existing process control systems are limited to using such tags for variables exposed as public parameters, and the public parameters are limited to the primary parameters of the field devices. Thus, the secondary parameters and other subsequent parameters of multi-variable devices cannot be tagged in existing process control systems because they cannot be exposed as public parameters in existing process control systems. The methods and systems described herein solve this problem of simplifying configuration of references to subsequent parameters of multi-variable devices within a process control system by exposing the subsequent parameters as public parameters, particularly by generating new virtual device objects for the subsequent parameters.

In particularly advantageous embodiments, the virtual device objects are created as child device objects of the device objects associated with the primary parameter of the multi-variable device. Thus, the parent device object represents the physical multi-variable device, while the child device objects are associated with the physical multi-variable device through their association with the parent device object. In addition to the advantages described above, these methods and systems further enable a system operator to identify whether a device object associated with a parameter represents a physical device or a virtual device created from a subsequent parameter of a physical device. Such distinction between physical and virtual devices is important during maintenance and troubleshooting, where an operator may need to locate the physical device within the process plant. By generating the virtual device objects as child device objects of the parent device object, the systems and methods allow the operator (e.g., a technician or control system engineer) to avoid confusion regarding the physical device within the process plant, should a need arise to access or replace the physical device.

Figure 2:
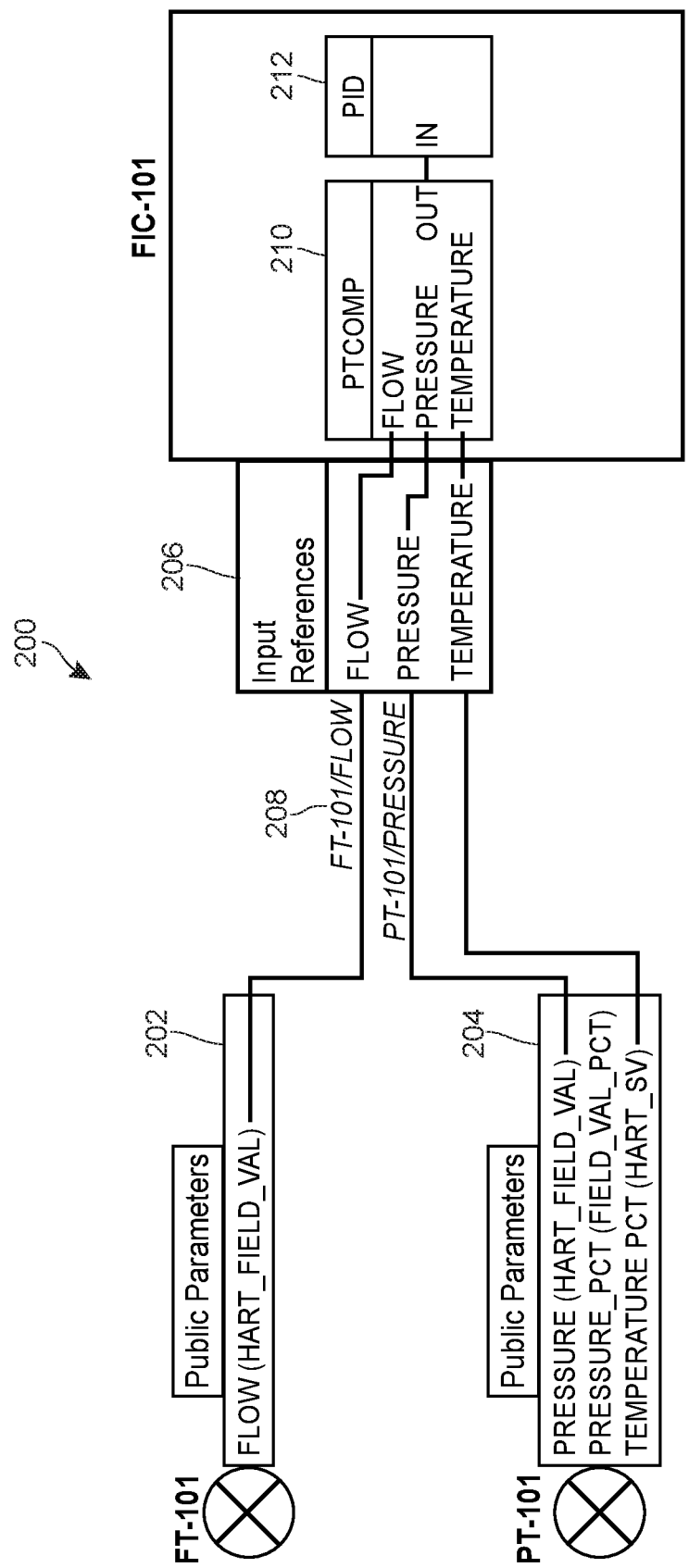
FIG. 2 is a block diagram illustrating an exemplary control circuit of a process control system including a multi-variable device.
Figure 3:
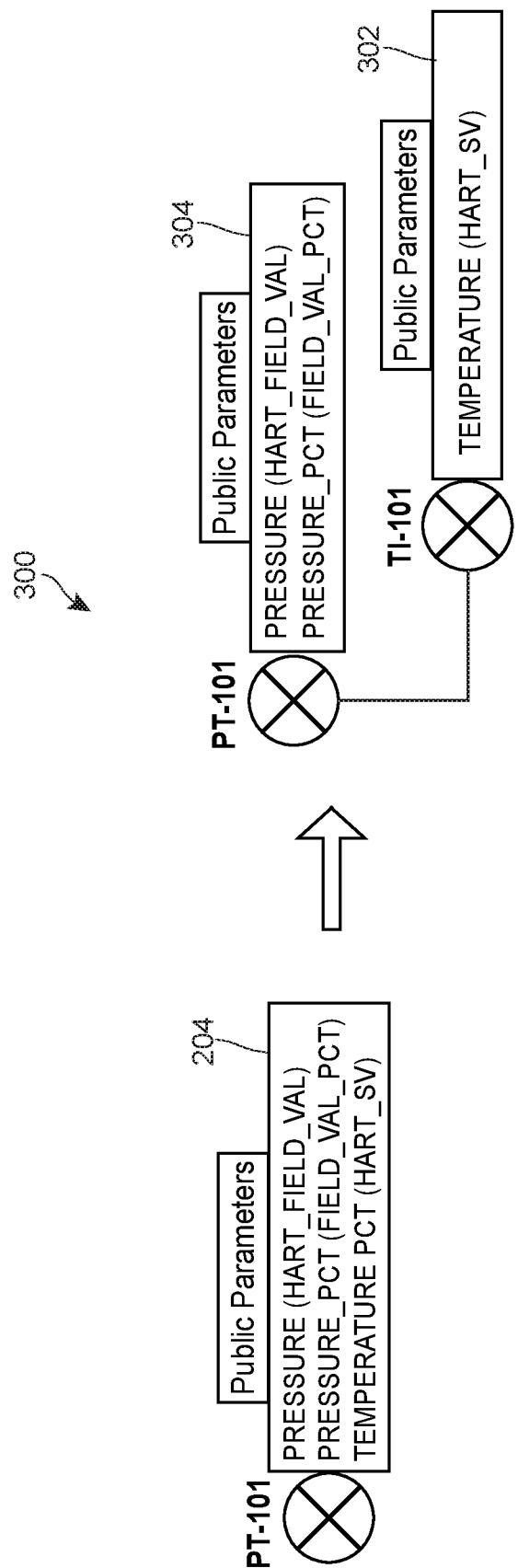
FIG. 3 is a block diagram illustrating an exemplary conversion of a multi-variable device object into a plurality of device objects.
Figure 4:
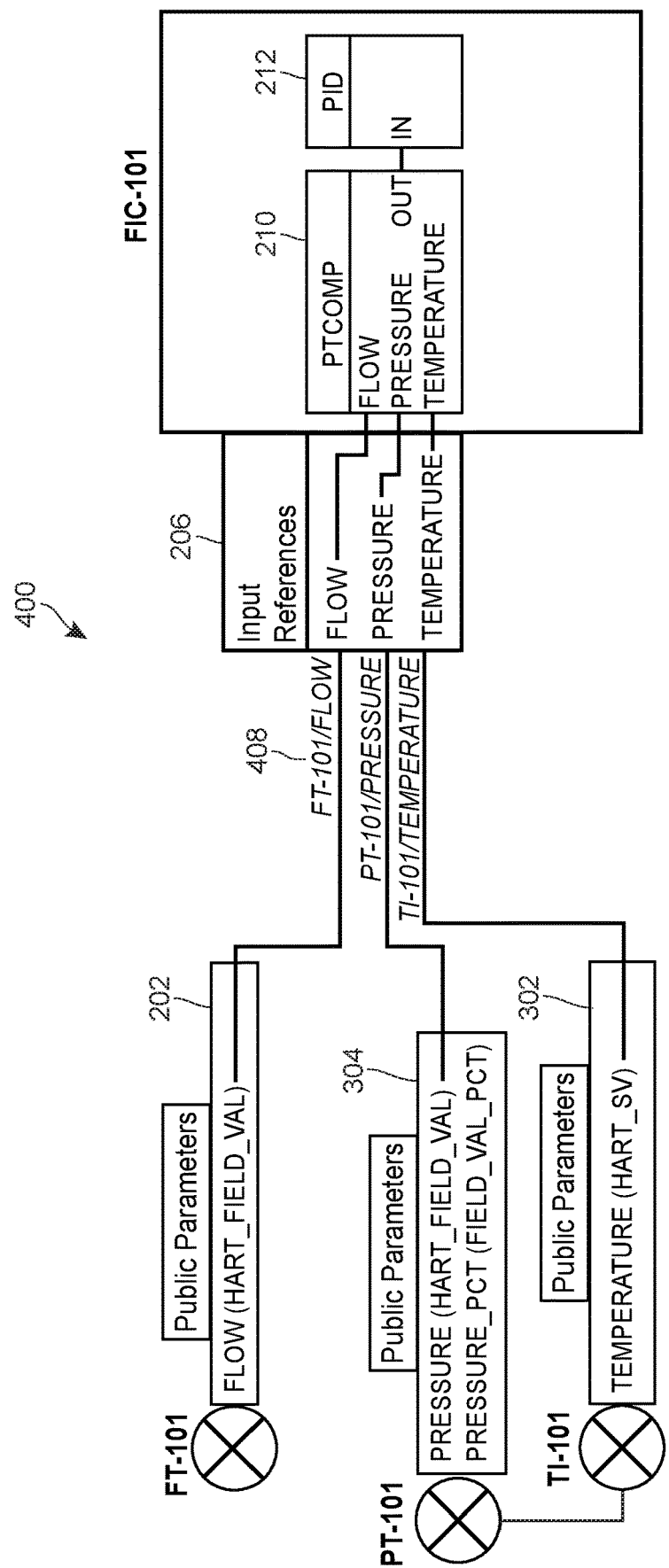
FIG. 4 is a block diagram illustrating an exemplary control circuit of a process control system including a plurality of device objects representing a multi-variable device.

FIGS. 2-4 illustrate alternative representations of portions of the process control network 100 of the process control system of process plant 10 to illustrate the process and effect of generating virtual device objects to represent parameters of multi-variable field devices. FIG. 2 illustrates a portion of the process control network 100 with a single-variable field device object, a multi-variable field device object with both primary and subsequent parameters exposed as public parameters, and a controller. FIG. 4 illustrates the same portion of the process control network 100, but the multi-variable field device is represented by a parent field device object and a child field device object of the parent device object. FIG. 3 illustrates the conversion of the multi-variable field device object into the parent field device object and the child field device object. Such conversion involves generating a new device object (the child field device object)

using a subsequent parameter of the multi-variable field device object as the primary parameter of the new device object. The new device object may be separately assigned a device tag within the process control system within the same namespace as the parent device object, which enables the new device object to be easily referenced during configuration or modification of the process control system.

FIG. 2 illustrates a block diagram of an exemplary control circuit 200 of the process control system, which may be a portion of the process control network 100. The exemplary control circuit 200 includes a multi-variable field device PT-101 and a single-variable field device FT-101, each of which may be included in the field devices 15-23 and 40-50 described above. The single-variable field device FT-101 produces output data for one parameter (FLOW), which is the sole public parameter 202 of the single-variable field device FT-101. The FLOW parameter is also identified with the private name of the primary parameter of the device (HART_FIELD_VAL). The tag of the single-variable field device FT-101 indicates that it generates data indicating a flow variable (e.g., flow rate within piping of the process plant 10). The multi-variable field device PT-101 produces output data for three public parameters 204 (PRESSURE, PRESSURE_PCT, and TEMPERATURE) relating to two types of measured variables (pressure and temperature). The tag of the multi-variable field device PT-101 indicates that the primary parameter (PRESSURE) of the device is associated with pressure data. The primary parameter PRESSURE is a public parameter identified with the private name of the primary parameter of the device (HART_FIELD_VAL). The parameter PRESSURE_PCT expresses a pressure measurement as a percentage. Additionally, the multi-variable field device PT-101 produces output data for a secondary parameter (TEMPERATURE) with private name HART_SV. Although the secondary parameter (TEMPERATURE) is a temperature measurement, the device PT-101 indicates output data associated with pressure measurements and the private name HART_SV does not indicate the type of output data. Thus, another means of identify the secondary parameter as a type of temperature variable is needed.

Both field devices PT-101 and FT-101 provide output data to a controller FIC-101, which may be a controller 11 described above, via input references 206. The input references 206 may reference the parameter of the single-variable field device FT-101 (FLOW) and the primary parameter of the multi-variable field device PT-101 (PRESSURE) via tags 208. Thus, the parameters FLOW of FT-101 and PRESSURE of PT-101 may be referenced by the tags FT-101/FLOW and PT-101/PRESSURE, respectively. In contrast, the subsequent parameter TEMPERATURE of the multi-variable field device PT-101 cannot be so referenced without generating a new virtual device object to represent the parameters (e.g., TI-101 having primary parameter TEMPERATURE). Otherwise, a type mismatch between the device tag PT-101 (indicating pressure) and the subsequent parameter TEMPERATURE will occur. Such a mismatch may be problematic because the process control system may use the device type to determine information regarding interpretation of the data received, which can result in improperly formatted or improperly interpreted data when a mismatch occurs. Therefore, the input reference 206 for the TEMPERATURE parameter of PT-101 is instead referenced by its full path to the secondary variable HART_SV of PT-101, or by the path to the public secondary variable TEMPERATURE of PT-101. Parameter PRESSURE_PCT is not used as an input to controller FIC-101 in the illustrated embodiment.

The output data produced by the field devices PT-101 and FT-101 is thus received by the controller FIC-101 as input data. The controller FIC-101 uses such input data to perform control functions by a plurality of control blocks 210 and 212. In the illustrated embodiment, the controller FIC-101 uses a composite block 210 (PTCOMP) to compensate the flow input (FLOW) based upon pressure (PRESSURE) and temperature (TEMPERATURE). The compensated flow is output by the composite block 210 and received by the control block 212 as an input to a PID control logic module, the output of which may be further used to control a process within the process plant 10.

Although the configuration as shown in FIG. 2 suffices to operate the portion of the process control system under most scenarios, the illustrated configuration is still somewhat difficult to configure or modify. To reference the subsequent parameter (TEMPERATURE) of the multi-variable field device PT-101, the controller FIC-101 must reference the full path to the variable within the field device and must further include instructions specifying the type of output expected from the variable. While the primary parameter (PRESSURE) of the multi-variable field device PT-101 may be understood by the process control system to have characteristics associated with pressure measurements, the secondary variable HART_SV carries no such information regarding an expected data type. Therefore, the control system engineer must also specify the type of data for the HART_SV variable (TEMPERATURE). To address these problems, the multi-variable field device PT-101 may be represented within the process control system as a plurality of device objects.

FIG. 3 illustrates an exemplary block diagram of the operation of a conversion process 300 for creating a plurality of device objects PT-101 and TI-101 from a multi-variable field device object PT-101 within the process control system. The multi-variable field device PT-101 is the same multi-variable filed device PT-101 discussed above with respect to FIG. 2 and has the same public parameters 204. In FIG. 3, the multi-variable field device object PT-101 is used to generate a new device object TI-101 as a virtual device object representing the subsequent parameter TEMPERATURE of multi-variable field device PT-101 as the primary parameter of the virtual field device TI-101. This new device object TI-101 is generated as a child device object of parent device object PT-101. Additionally, the parent device object PT-101 is modified to hide the secondary parameter TEMPERATURE, thereby avoiding confusion. Thus, the modified parent device object PT-101 exposes only PRESSURE and PTRESSURE_PCT as its public parameters 304, while the new child device object TI-101 exposes TEMPERATURE as its public parameter 302.

As illustrated, the new device object TI-101 exposes only the TEMPERATURE parameter as a public parameters 302. Within the process control system, therefore, the TEMPERATURE parameter is identified as the primary parameter of the virtual device object TI-101, rather than as a secondary parameter of device object PT-101. Moreover, the device tag of the new virtual device object (TI-101) indicates a field device that produces temperature measurements as output data. In contrast, the device tag of the multi-variable field device object and the parent device object (PT-101) indicates a field device that produces pressure measurements as output data. Thus, both the parent device object and the child device object are associated with device tags within the process control system that match the primary parameters of the respective device objects, which may be either the primary parameter or a subsequent parameter of the multi-variable field device.

The new device object TI-101 is generated as a child device with a limited set of parameters (i.e., only the primary parameter TEMPERATURE). The connection between the parent and child device objects allows an operator of the process control system to easily identify the physical device associated with both device objects PT-101 and TI-101. Additionally, configuration of the process control system is simplified by such arrangement. Any child device object (e.g., TI-101) may be added, removed, or modified without affecting the parent device object (e.g., PT-101). Removing the parent device object, however, removes the child device objects. Because the parent device object uniquely represents the physical multi-variable device, this asymmetry between changes to the parent and child device objects further improves configuration of the process control system. For example, when removing the multi-variable field device from the process plant 10, a process control engineer can remove all device objects associated with the multi-variable field device by simply removing the parent device object PT-101. In some embodiments, modifying the parent device object may automatically modify any child device objects. Thus, a process control engineer can reconfigure the process control system to reflect changes in the physical location of the multi-variable field device within the process plant 10 or changes in the communication path or protocol used to communicate with the multi-variable field device by simply modifying the parent device object.

FIG. 4 illustrates a block diagram of an exemplary control circuit 400 within the process control network 100 using virtual device objects. The exemplary control circuit 400 represents the exemplary control circuit 200, as described above, after converting the multi-variable field device object PT-101 with parameters 204 into both the parent device object PT-101 with parameters 304 and the child device object TI-101 with parameters 302. Because the child device object TI-101 is of the same type as the TEMPERATURE parameter, the tags 408 include a tag for TI-101/TEMPERATURE without creating a type mismatch. Thus, the use of virtual device objects to represent subsequent parameters of the multi-variable field device simplifies configuration of the input references 206 by enabling use of tags when referencing both primary parameters and subsequent parameters. Moreover, no changes are needed to the configuration or operation of the controller FIC-101 to achieve this improvement.

Figure 5:
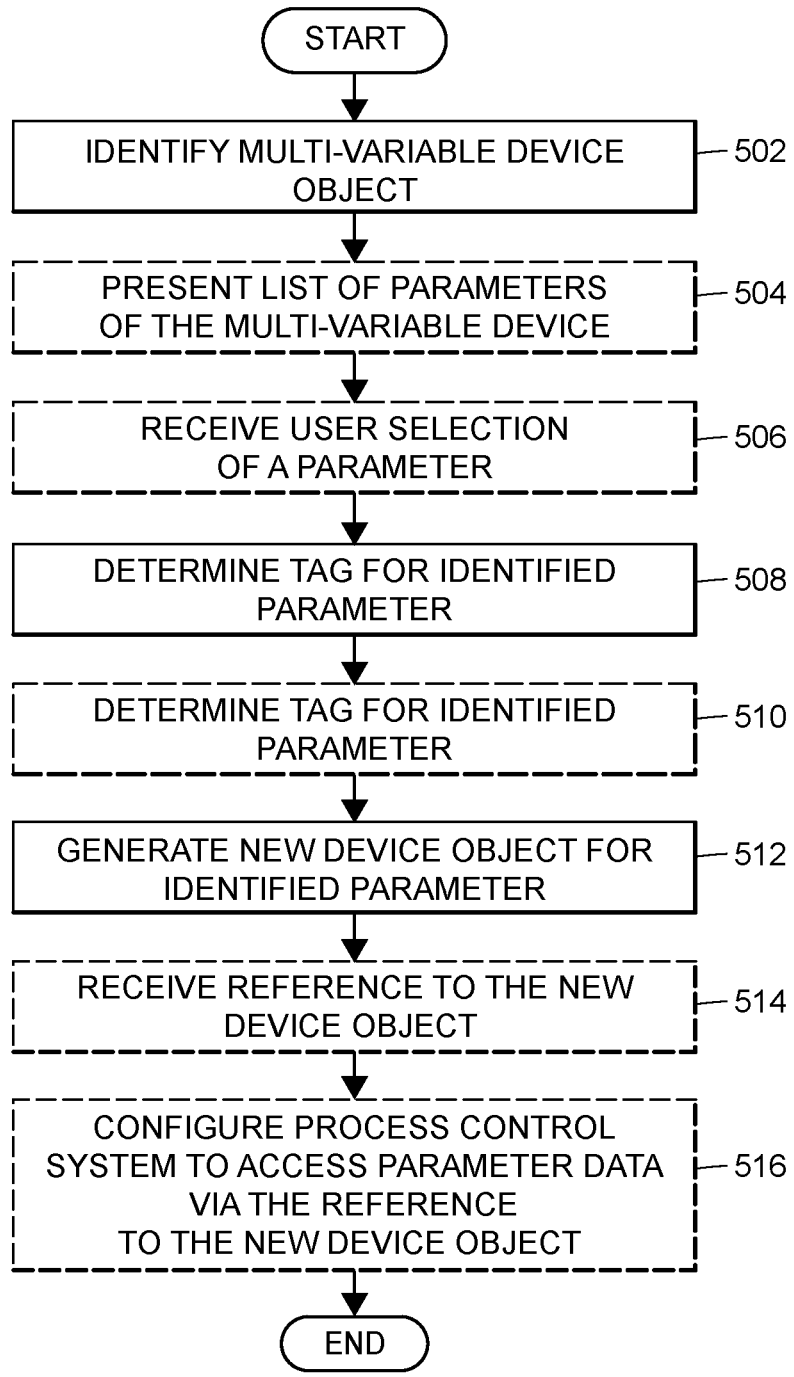
FIG. 5 is a flow chart depicting an exemplary method for generating new device objects from multi-variable device objects.

FIG. 5 illustrates a flow diagram of an exemplary device object generation method 500 for creating one or more child device objects from a parent device object representing a multi-variable device within the process control system of process plant 10. The method 500 may be used to convert a multi-variable device object within the process control system into a plurality of device objects, such as a parent device object and one or more child device objects. The method 500 may also be used to generate new child device objects from a parent device object associated with a multi-variable device object. The device objects may be associated with field devices 15-23 and 40-50, such as multi-variable device object PT-101 described above. In some embodiments, the device objects may likewise be associated with parameters generated by control blocks or similar routines running within a field device 15-23 or 40-50, a control device 24, or a controller 11.

The method 500 begins with the identification of the multi-variable device object (block 502), such as by a user selection of the device. In some embodiments, a list of parameters of the identified multi-variable device may be presented to the user (block 504), and a selection of a parameter from such list may be received from the user (block 506). Whether by such a user selection or otherwise, a parameter of the multi-variable device is identified for use as a primary parameter of a new device object (block 508). In some embodiments, a tag for the new device object may be identified based upon the parameter or user input (block 510). The new device object is then generated with the identified parameter as its primary parameter (block 512), preferably as a child device object of the multi-variable device object. The new device object may then be used in configuration of the process control system. In some embodiments, a reference to the new device object may be received from the user (block 514), and the process control system may be configured to access the parameter of the new device object based upon the reference (block 516). For example, the parameter of the new device object may be used as an input to a control block of a controller 11.

The method 500 may be implemented by one or more computers associated with the process control plant 10, such as the UI device 112 and the server 150 within the process control network 100. In some embodiments, the process 500 may be implemented on one or more computers not operating the process plant 10. Thus, the process control system may be designed, configured, and tested using other computer systems prior to being utilized in the process plant 10. Upon verification of proper operation, the configured process control system program may be stored in a non-transitory computer readable storage medium (e.g., a non-volatile memory device such as a hard disk drive or an optical disk). Part or all of the stored process control system program may then be downloaded, installed, or instantiated into the controller 11, UI device 112, expert system 104, or other components of the process control network 100 in order to implement the process control system within the process control network 100 to operate the process plant 10.

At block 502, the process control system identifies a multi-variable device object representing a multi-variable device within the process control network 100. The multi-variable device may be a multi-variable field device generating output data for a plurality of output variables associated with conditions within the process plant 10, such as a smart field device. In some embodiments, the multi-variable field device may include one or more function blocks executing analysis or control logic within the multi-variable field device. Such function blocks may generate calculated variables that may be exposed as output variables of the multi-variable field device. In other embodiments, the multi-variable device may be a controller 11 or a control device 24, or it may be a function block, module, or other routine running thereon. The controller 11 or control device 24 may generate, calculate, or aggregate a plurality of variables associated with conditions within the process plant 10. Such variables may include calculations of key performance indicators (KPIs) indicative of the performance of plant operation (e.g., efficiency of fuel use or raw material use, plant downtime or uptime, or similar performance indicators for part or all of the process plant 10). Regardless of whether the multi-variable device is a field device 15-23 or 40-50, a control device 24, or a controller 11, the processes described herein may be used to generate a plurality of device objects from one device object associated with the multi-variable device.

The multi-variable device object may be identified based upon a user selection of the device object or other indicator associated with the multi-variable device object. For example, the user may interact with the UI device 112 to select a graphical or textual indicator of the multi-variable device within the process control system, which indicator may itself be an object within that process control system that includes a reference to a device object. The user selection of the indicator may thus be used to identify the corresponding multi-variable device object based upon the reference. For example, the user may make a selection indicating the multi-variable device object in order to generate a child device object for a subsequent parameter of the multi-variable device object when configuration of the subsequent parameter is required for some purpose. Alternatively, the multi-variable device object may be automatically identified by the process control system. In some such embodiments, the process control system may automatically identify one or more multi-variable device objects within the process control system. For example, the multi-variable device objects may be identified when they are added to the process control system or in a batch process to identify some or all of the multi-variable device objects within the process control system. Automatic identification may be achieved by identifying device objects having both primary parameters and subsequent parameters. To avoid identifying previously configured parent device objects associated with multi-variable devices, the process control system may identify only device objects having subsequent parameters for which no child device objects exist within the process control system. However the multi-variable device object is identified, the process 500 may then proceed to convert the multi-variable device object into a plurality of device objects by identifying at least one subsequent parameter and generating a new device object for such identified subsequent parameter of the multi-variable device object.

At blocks 504 and 506, in some embodiments, the process control system may present a list of parameters to and receive a selection from a user. At block 504, a list of parameters of the multi-variable field device object may be generated and then presented to the user via a UI device 112. The list of parameters may be generated by collecting all the parameters configured in the multi-variable device object, or the list of parameters may be generated by the process control system by identifying all the available output variables of the multi-variable device. The output variables of the multi-variable device may be identified, for example, by examination of information contained within a device description file for the device. Such device description file may be accessed from a database of the process control network 100 or may be accessed from a device memory of the multi-variable device. The device description file may be processed to identify the output variables of the multi-variable device, which may then be collected into a list as available parameters of the multi-variable device object. Such list of parameters may exclude the primary parameter of the multi-variable device object, in some embodiments, as the primary parameter of the multi-variable device is used as the primary parameter of the parent device object. Once a list of one or more parameters is generated, the list may be presented to the user via the UI device 112. In response, the user may select one or more of the parameters from the list, and the process control system may receive such user selection at block 506. In some embodiments, the user selection may further include an indication of a virtual tag to be associated with the parameter and the new device object as a reference within the process control system.

At block 508, the process control system identifies a parameter associated with an output variable of the multi-variable device for which to generate a new device object. The identified parameter is preferably a subsequent parameter of the multi-variable device object. The parameter may be identified by a user of the process control system, such as by a user selection of the parameter from a list of parameters, as described above. Alternatively, the parameter may be identified by user input specifying the parameter, such as by reference to a private or public parameter name (e.g., TEMPERATURE or HART_SV). In other embodiments, the parameter may be identified by the process control system. For example, the process control system may iteratively identify each of the parameters of the multi-variable device in order to generate new device objects.

At block 510, in some embodiments, the process control system may determine a tag to be associated with the new device object and the parameter. The tag may be a virtual tag within the process control system to identify the new device object. As noted above, the user selection of the parameter may include an indication of the tag from the user. Alternatively, the user may separately specify the tag, or the tag may be automatically determined. The tag may be determined based upon a user input or selection, or a default tag for the type of parameter may be generated by the process control system (e.g., the next available number of a device tag for a parameter type). Such tag may be used as a reference for the new device object and/or the identified parameter associated with the new device object within the process control system.

At block 512, the process control system generates a new device object for the identified parameter. The new device object is generated as an object within the process control system having the identified parameter as the primary parameter of the new device object, which may be the sole public parameter of the new device object. The new device object may include the identified parameter as its only parameter, without access to the other parameters of the multi-variable device. Thus, the new device object may be generated with one primary parameter (i.e., the identified subsequent parameter of the multi-variable device object) and no subsequent parameters. In some embodiments, the new device object may nonetheless include a scaling factor or other information associated with the identified parameter. Additionally, the new device object may be associated with a virtual tag within the process control system, which may represent a path within the process control network 100 to the new device object and/or to the primary parameter of the new device object. The virtual tag may be a unique virtual tag within the process control system, within the same namespace as the tag for the parent multi-variable device object. In further embodiments, generating the new device object may include accessing an object library of the process control system to select a class of device objects. An instance of the selected class of device objects may then be customized with information associated with the identified parameter, assigned a unique virtual tag, and linked to the multi-variable device object in order to generate the new device object.

In preferred embodiments, the new device object is generated as a child device object of the multi-variable device object, with the multi-variable device object becoming the parent device object to the new device object. Such configuration is illustrated in FIG. 3 above, in which the new device object TI-101 is generated as a child device object of parent device object PT-101. Also as illustrated in FIG. 3 above, the multi-variable device object may be modified as the parent device object to hide the subsequent parameter associated with the child device object (i.e., TEMPERATURE). By generating the new device object as a child device object of the parent device object, the new device object is linked to the multi-variable device in the process plant 10, which is uniquely represented by the parent device object.

Once generated, the new device object may be referenced and used within the process control system in the same manner as any other device object. Blocks 514 and 516 further illustrate configuring the process control system to operate the process plant 10 using the new device object. At block 514, in some embodiments, the process control system receives a reference to the new device object. The reference to the new device object may be indicated by a user selection of an indication of the new device object. Such user selection may further indicate a function block or module within the process control system to receive output data from the new device object. In some embodiments, the user may indicate the new device object by the unique virtual tag associated with the new device object. Similarly, indicating the new device tag without specifying a parameter is interpreted by the process control system as a reference to the primary parameter of the new device object (i.e., the identified parameter of the multi-variable device object). Thus, the virtual tag of the new device object may be used like any other tag associated with any other device object within the process control system. At block 516, in some embodiments, the process control system may be configured to access output data associated with the identified parameter based upon the received reference. The process control system may be configured using the reference to the primary parameter of the new device object to provide the corresponding output data of multi-variable device to a function block or other data consumer within the process control system. Such configuration may also include use of a scaling parameter of the new device object to scale the output data. Thus, the process control system may be configured to access the output data associated with a subsequent parameter of the multi-variable device using the new device object, as though the new device object represented a physical single-variable device within the process control network 100.

Figure 6:
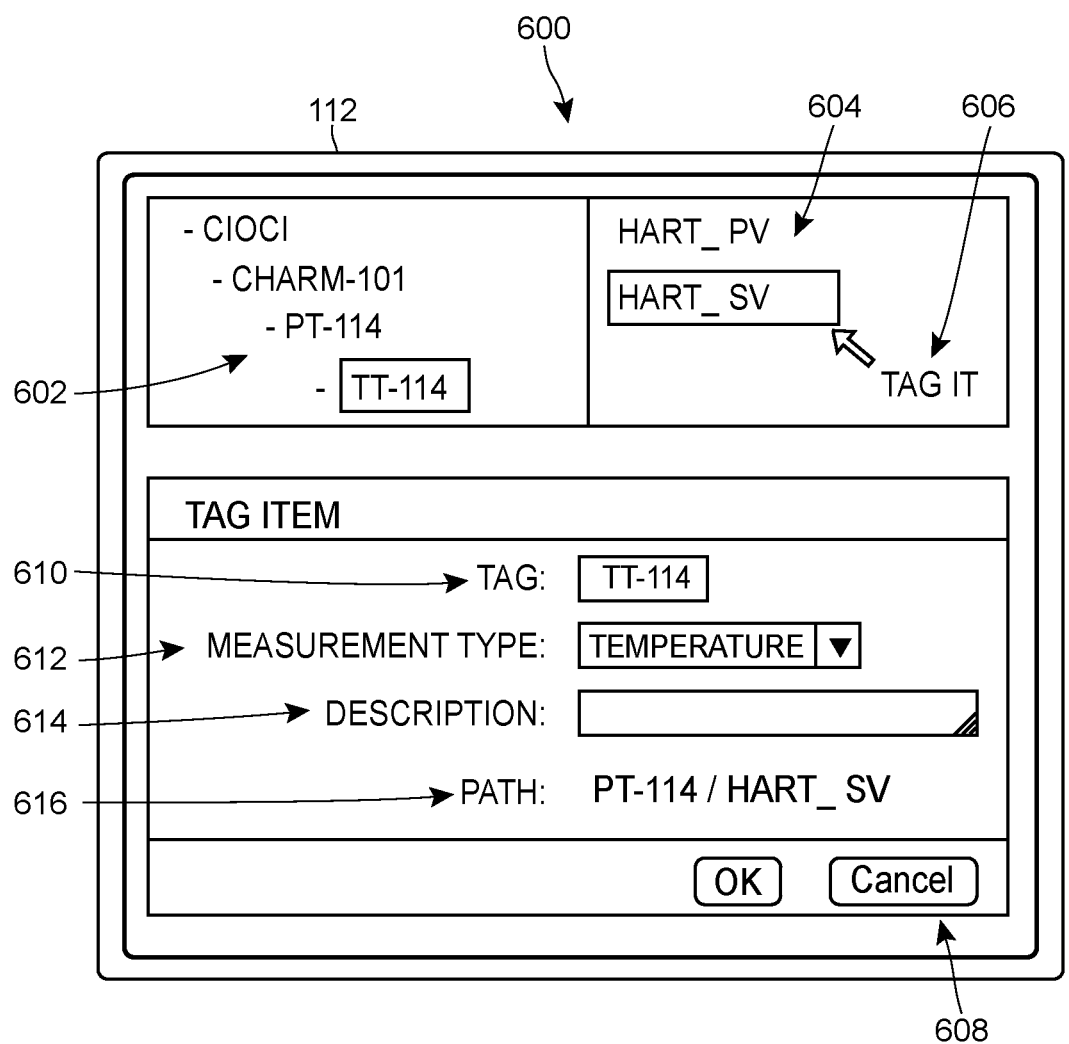
FIG. 6 is an exemplary display of user interface for generating or tagging a new device object using a user interface device.

FIG. 6 illustrates an exemplary configuration display 600 that may be presented to a user via a UI device 112 to facilitate configuration of a child device object from a multi-variable device object. The user may interact with the configuration display 600 to generate a new device object as discussed above or to configure an existing device object, such as by adding a tag to the device object. The configuration display 600 includes a path representation 602 showing the path to a multi-variable device (PT-114). Any child device objects may also be displayed in the path representation 602 (e.g., TT-114). The configuration display 600 may also include a parameter list 604, showing the parameters of a selected device object. As illustrated, the parameter list of the multi-variable device object PT-114 includes a primary parameter (HART_PV) and a secondary parameter (HART_SV). The user may input an indication of a command to tag or generate a new device object associated with one of the parameters of the parameter list 604, which is illustrated by the arrow 606. Upon such command or user selection, a device object configuration window 608 may be presented to the user. The device object configuration window may allow the user to view, modify, or input information regarding the device object, which may be a newly generated child device object or an existing device object within the process control system. Such information may include a tag field 610 indicating the tag (TT-114) of the device object, a variable types field 612 indicating a type of the primary parameter (TEMPERATURE) associated with the device object, a description field 614 to include any user notes regarding the device object or variable, and a path field 616 displaying the path to the primary parameter of the selected device object (PT-114/HART_SV). The illustrated configuration display 600 is exemplary only, and other similar displays may instead be used. Such other displays may include additional, alternative, or fewer components, and the components of the other displays may be arranged in a different layout.

Figure 7:
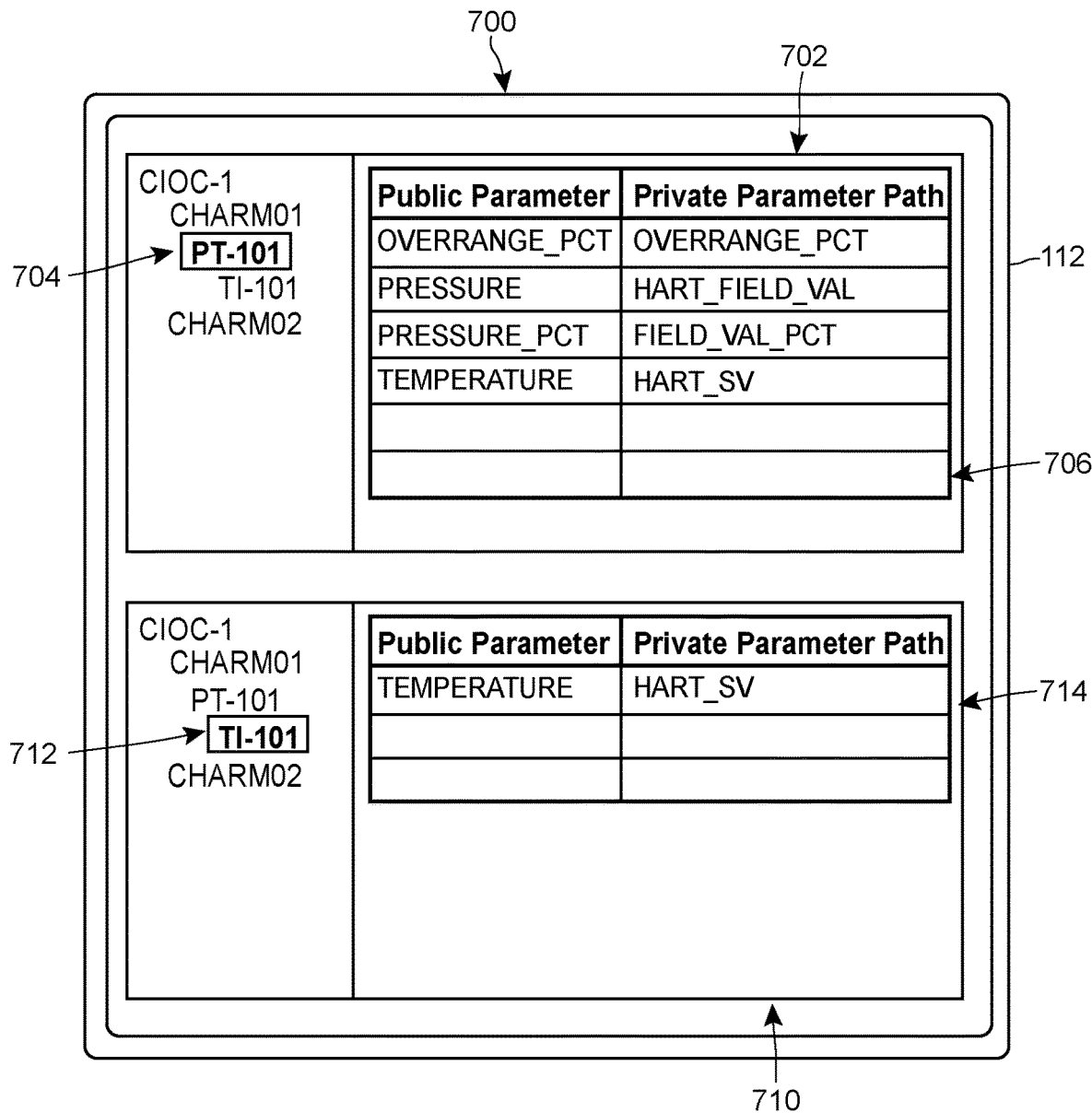
FIG. 7 is an exemplary display of a user interface illustrating representations of information associated with a parent device object and a child device object.

FIG. 7 illustrates an exemplary information display 700 that may be presented to a user via a UI device 112 to show information associated with a parent device object and a child device object. The information display 700 includes a parent device object table 702 presenting information associated with the parent device object (PT-101) and a child device object table 710 presenting information associated with the child device object (TI-101). The parent device object table 702 shows a path 704 including the parent device object (PT-101), which is highlighted to identify the parent device object. The parent device object table 702 also shows a parameter list 706 for the parent device object, which lists all the parameters of the parent device object. Similarly, the child device object table 710 shows a path 712 including the child device object (TI-101), which is highlighted to identify the child device object, as well as a parameter list 714. Unlike the parameter list 706 of the parent device object, the parameter list 714 of the child device object only includes one parameter, viz. the primary parameter of the child device object, which is the secondary parameter of the parent device object representing the multi-variable device in the process control system. Thus, the information display 700 allows the user to obtain information regarding the path and parameters of a plurality of device objects simultaneously. The information 700 may also enable the user to quickly determine whether a device object is a real device object (i.e., a parent device object representing a physical device within the process plant) or a virtual device object (i.e., a child device object) generated from a subsequent parameter of a multi-variable device object.

Figure 8:
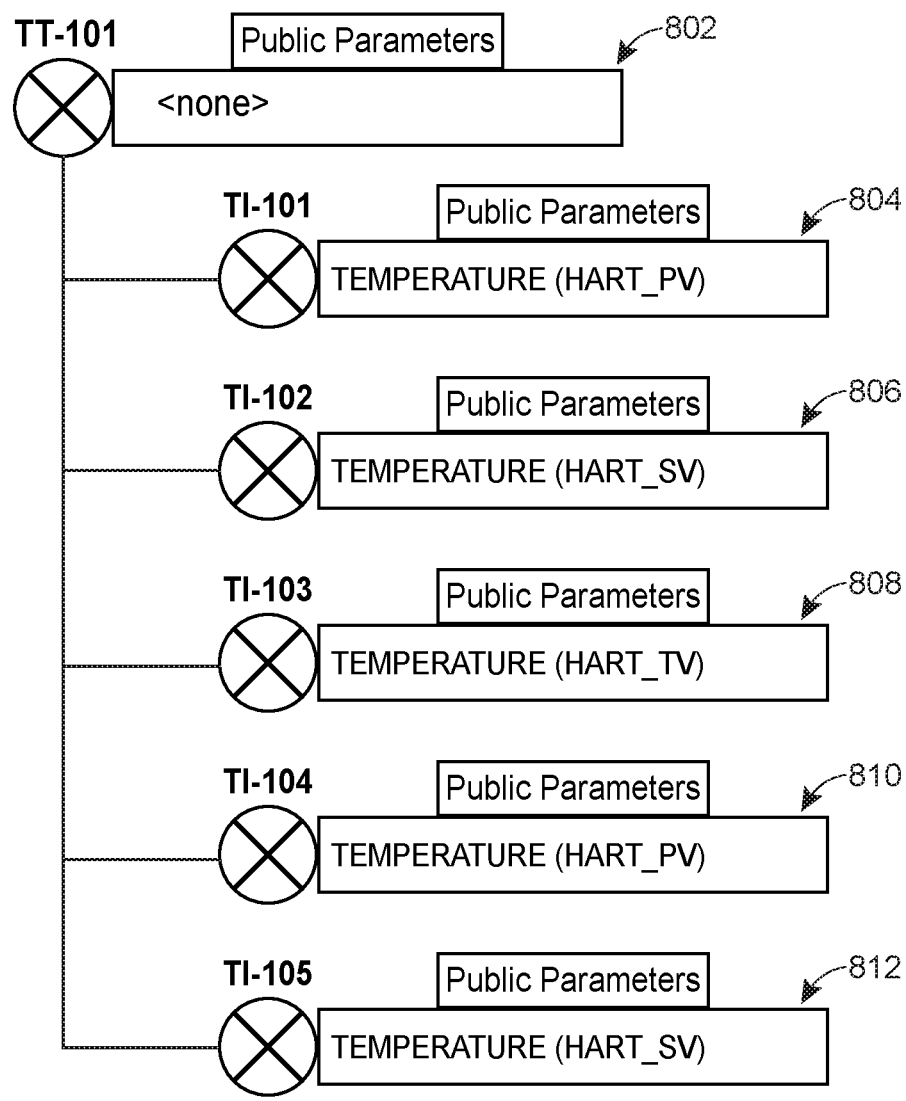
FIG. 8 is a block diagram illustrating an exemplary multi-variable device having a plurality of child device objects.

Although the examples discussed herein have frequently been limited to a multi-variable device having one primary parameter and one secondary parameter, additional secondary parameters may be available for some devices. Thus, in some instances, multi-variable device objects may be represented as a parent device object and a plurality of child device objects. FIG. 8 illustrates a block diagram of a representation of a multi-variable device having generating five output variables, associated with five parameters. The multi-variable device is represented within the process control system as a parent device object (TT-101) and a plurality of child device objects (TI-101, TI-102, TI-103, TI-104, and TI-105). Each of the child device objects TI-101, TI-102, TI-103, TI-104, and TI-105 has one primary parameter indicated in its parameter list 804, 806, 808, 810, and 812, respectively. In the exemplary embodiment illustrated in FIG. 8, the parent device object TT-101 has no parameter associated with it in its parameter list 802. Instead, the primary parameter of the multi-variable device (HART_PV) is associated with one of the child device objects (TI-101). The parent device object still uniquely identifies the physical multi-variable device, but all the parameters of the device may be identified by their corresponding child device objects. Thus, each parent device object may have zero or more parameters directly associated with it, while any number of parameters may be indirectly associated with the parent device object through association with the child device objects.

Additional Considerations

The following additional considerations apply to the foregoing discussion. Throughout this specification, actions described as performed by the server 150, the UI device 112, or any other device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a non-transitory computer readable medium (i.e., on a memory device). The instructions, when executed by one or more processors of a corresponding device (e.g., a server, a mobile device, etc.), cause the processors to execute the method. Where instructions, routines, modules, processes, services, programs, or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. As can be appreciated from the foregoing description, the systems, apparatus, and methods described herein may have the benefit or effect of improving the ability of such personnel to configure or operate a process control system. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computer-implemented method of configuring a process control system for controlling a process plant, comprising:
   selecting a device object within the process control system, wherein the device object represents a multi-variable device within the process plant;
   identifying a parameter of the multi-variable device, the parameter being associated with an output variable generated by the multi-variable device; and
   generating a new device object representing the identified parameter within the process control system, wherein the new device object includes a primary parameter representing the output variable of the multi-variable device.

2. The computer-implemented method of claim 1, wherein generating the new device object includes generating a unique virtual tag for the new device object within the process control system.

3. The computer-implemented method of claim 2, wherein generating the new device object includes generating the unique virtual tag in a common namespace with a tag of the device object.

4. The computer-implemented method of claim 2, further comprising:
   presenting a list of parameters of the multi-variable device to a user of the process control system, including the identified parameter;
   receiving a selection of the identified parameter from the user, wherein the identified parameter is identified based upon the received selection; and
   receiving an indication of the unique virtual tag from the user, wherein the new device object is generated using the received indication of the unique virtual tag by associating the unique virtual tag with a path to the identified parameter of the multi-variable device.

5. The computer-implemented method of claim 4, further comprising:
   receiving an indication of a reference to the unique virtual tag from a user of the process control system, wherein the indication of the reference further associates the unique virtual tag with a function block within the process control system; and
   providing output data for the output variable associated with the identified parameter to the function block via the path associated with the unique virtual tag.

6. The computer-implemented method of claim 1, wherein the new device object is a child device object of the device object.

7. The computer-implemented method of claim 6, wherein generating the child device object includes:
selecting a class of device objects from an object library of the process control system; and
customizing an instance of the selected class of device objects as the child device object.

8. The computer-implemented method of claim 1, wherein the multi-variable device is a smart field device generating data associated with a plurality of types of output variables.

9. The computer-implemented method of claim 1, wherein:
the multi-variable device includes a control module; and
the parameter is a calculated variable that is generated by the control module based upon other variables within the control module.

10. The computer-implemented method of claim 9, wherein the calculated variable is a key performance indicator (KPI) used in control of the process plant.

11. The computer-implemented method of claim 1, wherein:
the multi-variable device is a field device installed with the process plant, the field device generating output data associated with a primary parameter and with one or more subsequent parameters; and
the identified parameter is associated with one of the subsequent parameters.

12. The computer-implemented method of claim 1, wherein the new device object includes a scaling parameter associated with the identified parameter.

13. The computer-implemented method of claim 1, wherein:
the multi-variable device is associated with a plurality of types of output variables; and
identifying the parameter further includes identifying each of the plurality of types of output variables based upon information contained in a device description file of the multi-variable device.

14. A process control system for operating a process plant, comprising:
a multi-variable device generating output data for a plurality of output variables within the process plant; and
one or more processors communicatively connected to the multi-variable device and to a program memory storing executable instructions that, when executed by the one or more processors, cause the process control system to:
select a device object representing the multi-variable device within the process control system;
identify a parameter of the multi-variable device, the parameter being associated with one of the plurality of output variables of the multi-variable device; and
generate a new device object representing the identified parameter within the process control system, wherein the new device object includes a primary parameter representing the one output variable of the multi-variable device.

15. The process control system of claim 14, wherein the multi-variable device is a smart field device and the plurality of output variables include a plurality of types of output variables.

16. The process control system of claim 14, wherein:
the multi-variable device includes a control module; and
the one of the output variables is a calculated variable that is generated by the control module based upon other variables within the control module.

17. The process control system of claim 14, wherein:
the multi-variable device is a field device installed with the process plant, the field device generating the output data by measuring values of the plurality of output variables within the process plant;
the plurality of output variables include output variables associated with a primary parameter of the device object and a subsequent parameter of the device object; and
the identified parameter is associated with the subsequent parameter of the device object.

18. The process control system of claim 14, wherein:
the multi-variable device includes a device description file; and
the executable instructions that cause the process control system to identify the parameter cause the process control system to identify each of the plurality of output variables based upon information contained in the device description file of the multi-variable device.

19. The process control system of claim 14, wherein the executable instructions that cause the process control system to generate the new device object cause the process control system to generate the new device object as a child device object of the device object.

20. The process control system of claim 14, wherein the executable instructions that cause the process control system to generate the new device object cause the process control system to generate a unique virtual tag for the new device object within the process control system.

21. The process control system of claim 20, wherein:
the executable instructions further cause the process control system to:
present a list of parameters of the multi-variable device to a user of the process control system, including the identified parameter;
receive a selection of the identified parameter from the user;
receive an indication of the unique virtual tag from the user;
receive an indication of a reference to the unique virtual tag from the user;
associate the unique virtual tag with a function block within the process control system based upon the received indication of the reference to the unique virtual tag; and
provide the output data for the one output variable associated with the identified parameter to the function block via a path to the identified parameter associated with the unique virtual tag; and
the executable instructions that cause the process control system to identify the identified parameter cause the process control system to identify the identified parameter based upon the received selection of the identified parameter from the user; and
the executable instructions that cause the process control system to generate the new device object cause the process control system to generate the new device object using the received indication of the unique virtual tag by associating the unique virtual tag with the path to the identified parameter of the multi-variable device.

22. A tangible, non-transitory computer-readable medium storing executable instructions for configuring a process control system for controlling a process plant that, when executed by at least one processor of a computer system, cause the computer system to:

select a device object within the process control system, wherein the device object represents a multi-variable device within the process plant;

identify a parameter of the multi-variable device, the parameter being associated with an output variable generated by the multi-variable device; and generate a new device object representing the identified parameter within the process control system, wherein the new device object includes a primary parameter representing the output variable of the multi-variable device.

23. The tangible, non-transitory computer-readable medium of claim 22, wherein the executable instructions that cause the computer system to generate the new device object further cause the computer system to generate a unique virtual tag for the new device object within the process control system.

24. The tangible, non-transitory computer-readable medium of claim 23, further storing executable instructions that cause the computer system to:

present a list of parameters of the multi-variable device to a user of the process control system, including the identified parameter;

receive a selection of the identified parameter from the user; and receive an indication of the unique virtual tag from the user;

wherein the executable instructions that cause the computer system to identify the identified parameter cause the computer system to identify the identified parameter based upon the received selection of the identified parameter from the user; and wherein the executable instructions that cause the computer system to generate the new device object cause the computer system to generate the new device object using the received indication of the unique virtual tag by associating the unique virtual tag with a path to the identified parameter of the multi-variable device.

25. The tangible, non-transitory computer-readable medium of claim 23, further storing executable instructions that cause the computer system to:

receive an indication of a reference to the unique virtual tag from a user of the process control system;

associate the unique virtual tag with a function block within the process control system based upon the received indication of the reference to the unique virtual tag; and provide output data for the output variable associated with the identified parameter to the function block via a path to the identified parameter associated with the unique virtual tag.

26. The tangible, non-transitory computer-readable medium of claim 22, wherein the executable instructions that cause the computer system to generate the new device object cause the computer system to generate the new device object as a child device object of the device object.

27. The tangible, non-transitory computer-readable medium of claim 26, wherein the executable instructions that cause the computer system to generate the new device object cause the computer system to generate the new device object by:

selecting a class of device objects from an object library of the process control system; and customizing an instance of the selected class of device objects as the child device object.

28. The tangible, non-transitory computer-readable medium of claim 22, wherein:

the multi-variable device includes a control module; and the parameter is a calculated variable that is generated by the control module based upon other variables within the control module.

29. The tangible, non-transitory computer-readable medium of claim 22, wherein the executable instructions that cause the computer system to generate the new device object cause the computer system to include in the new device object a scaling parameter associated with the identified parameter.

30. The tangible, non-transitory computer-readable medium of claim 22, further storing executable instructions that cause the computer system to:

access information contained within a device description file of the multi-variable device; and identify a plurality of output variables of the multi-variable device based upon the information within the device description file, the plurality of output variables including the identified parameter.

\* \* \* \* \*